United States Patent
Kwon et al.

(10) Patent No.: US 9,322,721 B2
(45) Date of Patent: Apr. 26, 2016

(54) OPTIC FIBER DISTRIBUTED TEMPERATURE SENSOR SYSTEM WITH SELF-CORRECTION FUNCTION AND TEMPERATURE MEASURING METHOD USING THEREOF

(75) Inventors: Il Bum Kwon, Daejeon (KR); Dong Jin Yoon, Daejeon (KR); Dusun Hwang, Seoul (KR)

(73) Assignee: KOREA RESEARCH INSTITUTE OF STANDARDS AND SCIENCE, Daejeon (KR)

( * ) Notice: Subject to any disclaimer, the term of this patent is extended or adjusted under 35 U.S.C. 154(b) by 394 days.

(21) Appl. No.: 13/813,890

(22) PCT Filed: Aug. 1, 2011

(86) PCT No.: PCT/KR2011/005653
§ 371 (c)(1),
(2), (4) Date: Mar. 6, 2013

(87) PCT Pub. No.: WO2012/018214
PCT Pub. Date: Feb. 9, 2012

(65) Prior Publication Data
US 2013/0156066 A1 Jun. 20, 2013

(30) Foreign Application Priority Data
Aug. 5, 2010 (KR) .................. 10-2010-0075660

(51) Int. Cl.
*G01K 11/00* (2006.01)
*G01K 11/32* (2006.01)

(52) U.S. Cl.
CPC .......... *G01K 11/32* (2013.01); *G01K 2011/322* (2013.01); *G01K 2011/324* (2013.01)

(58) Field of Classification Search
CPC ............ G01K 11/32; G01K 2011/322; G01K 2011/324
USPC .................. 374/E11.015, 73.1, 161; 356/301
See application file for complete search history.

(56) References Cited

U.S. PATENT DOCUMENTS

| | | | |
|---|---|---|---|
| RE34,153 E * | 12/1992 | Benner et al. ................. | 356/301 |
| 5,765,948 A | 6/1998 | Sai | |
| 7,284,903 B2 * | 10/2007 | Hartog ........................... | 374/130 |
| 7,719,666 B2 * | 5/2010 | Kishida et al. ............... | 356/73.1 |
| 8,152,370 B2 * | 4/2012 | Martinelli et al. ............ | 374/161 |
| 2006/0245468 A1 * | 11/2006 | Hartog ........................... | 374/161 |
| 2007/0229816 A1 * | 10/2007 | Chen et al. .................... | 356/301 |

(Continued)

FOREIGN PATENT DOCUMENTS

| | | |
|---|---|---|
| JP | 2007-240174 | 9/2007 |
| JP | 2007-240294 | 9/2007 |
| KR | 10-2010-0042773 | 4/2010 |

OTHER PUBLICATIONS

Hwang et al. "Novel auto-correction method in a fiber-optic distributed-temperature sensor using reflected anti-Stokes Raman scattering". Optics Express, vol. 18 Issue 10, pp. 9747-9754. Apr. 26, 2010. <http://www.opticsinfobase.org/oe/viewmedia.cfm?URI=oe-18-10-9747&seq=0&origin=search>.*

*Primary Examiner* — Lisa Caputo
*Assistant Examiner* — Jonathan Dunlap

(57) ABSTRACT

The present invention is effective in that automatically corrected temperature can be measured using one light source and one optical detector.

14 Claims, 6 Drawing Sheets

(56) References Cited

U.S. PATENT DOCUMENTS

| | | | |
|---|---|---|---|
| 2008/0007716 A1* | 1/2008 | Igarashi | 356/72 |
| 2010/0220765 A1* | 9/2010 | Martinelli et al. | 374/161 |
| 2011/0090936 A1* | 4/2011 | Kupershmidt | 374/142 |
| 2012/0206718 A1* | 8/2012 | Jaaskelainen | 356/73.1 |

* cited by examiner

OPTIC FIBER DISTRIBUTED TEMPERATURE SENSOR SYSTEM WITH SELF-CORRECTION FUNCTION AND TEMPERATURE MEASURING METHOD USING THEREOF

TECHNICAL FIELD

The present invention relates to an optical fiber distributed temperature sensor system having an automatic correction function and a method for measuring temperature using thereof, and more specifically, to an optical fiber distributed temperature sensor system having an automatic correction function and a method for measuring temperature using thereof, in which one light source and one optical detector can be used by providing a reflecting means in the distributed temperature sensor system, and thus temperatures distributed along the optical fiber can be measured using only an anti-stokes Raman scattering optical signal.

BACKGROUND ART

Generally, the principle of measuring temperatures distributed in a measured optical fiber using a back scattering light of the optical fiber is as described below. If an optical pulse of an excitation light source enters into the measured optical fiber, a scattering light is generated in the optical fiber, and a part of the scattering light is fed back into the incoming end of the measured optical fiber, and thus the back scattering light is formed. Most of the back scattering light is a Rayleigh scattering light having a wavelength that is the same as that of an incident light, and a small amount of a Raman scattering light having a wavelength shifted by Raman scattering is also included in the back scattering light. Intensity of the Rayleigh scattering light is generally about 1/100 of that of the incident light, and the Raman scattering light is as weak as about 1/10,000 of the Rayleigh scattering light. The Raman scattering light contains a stokes light whose wavelength is shifted toward a long wavelength and an anti-stokes light whose wavelength is shifted toward a short wavelength with respect to the incident light. The Raman scattering occurs when the light entered into the optical fiber collides with Silica molecules. Since the amount of motion of the Silica molecules is changed depending on a temperature, the scattering amount depending on the temperature is changed. That is, intensity of the stokes light and the anti-stokes light depends on the absolute temperature. Accordingly, if a ratio between the stokes light and the anti-stokes light is obtained, distribution of temperatures in the lengthwise direction of the measured optical fiber can be obtained. At this point, only the anti-stokes light is affected by the temperature, and the stokes light is measured in order to compensate drift of the light source by measuring the scattering amount. In order to measure the distributed temperatures of the optical fiber by separating and extracting the Raman scattering light from the back scattering light of the measured optical fiber based on the principles described above, the optical fiber distributed temperature sensor is absolutely required.

FIG. 1 is a view schematically showing the configuration of a conventional Raman sensor system. The Raman sensor system shown in FIG. 1 measures a temperature by the distance using a Raman phenomenon. The Raman sensor system generally comprises a power supply unit, a laser diode, a pulse generator, an optical fiber circulator, a Raman scattering measurement filter, an optical detector, an analog-to-digital converter (ADC), and the like. If a pulse-modulated incident light generated by the laser diode is transmitted into the measured optical fiber, delay of light occurs depending on the distance. Accordingly, an input optical signal of a pulse form is rendered into a scattering signal having a back distance resolution. The scattering signal generated from the optical fiber is divided into scattering signals having different wavelengths using the Raman filter. The Rayleigh scattering signal having a wavelength the same as that of the incident light generated by the laser diode is received in a Rayleigh scattering region, and an anti-stokes scattering signal and a stokes scattering signal capable of measuring changes of a signal with respect to changes of temperature are received in an anti-stokes scattering region and a stokes scattering region. The Rayleigh scattering signal, the anti-stokes scattering signal, and the stokes scattering signal received in the scattering regions are individually detected by the optical detector, and the detected signals are converted into digital signals by the analog-to-digital converter.

However, incorrectness of intensity distribution of the back scattering light in the Raman sensor system has been raised as a serious problem. The incorrectness is not only affected simply by temperature, but also caused by local attenuation generated by physical disturbance in the optical fiber. Influence of the local attenuation needs to be removed in order to avoid measurement errors caused by the incorrectness of intensity distribution. The incorrectness is mainly caused by a wavelength difference ranging from 100 nm to 200 nm between the stokes light and the anti-stokes light and dependency on the wavelength of the incident light. In addition, optical fibers manufactured in different manufacturing processes have differential attenuation distribution. Furthermore, the differential attenuation further increases when the optical fiber is obstructed by bending, tension, compression, radiation, and chemical contamination. In the case of the bending and compression, the differential attenuation is relatively small and thus can be compensated by a Rayleigh wave or a stokes wave. In addition, gamma ray radiation in a nuclear structure is a typical reason of a temperature error caused by the differential attenuation. Although a few methods using Rayleigh and anti-stokes bands have been proposed in order to solve the problems, the problem of difference in the wavelength still remains, and thus the differential attenuation caused by the wavelength difference cannot be completely removed.

In order to solve the problem, a dual-ended method for automatically correcting the differential attenuation has been proposed. However, although this method has a lot of advantages when the measured optical fiber is damaged, there is a problem in that an optical fiber two times as long as the measured optical fiber and an additional distributed temperature sensor channel are required. Later, a method of using a dual-light source has been proposed in order to solve the problem of the dual-ended method. However, the method of using a dual-light source still has a problem in that an additional light source, an optical switch, and two optical detectors are needed.

Accordingly, it needs to develop a method of further simply and completely measuring an automatically corrected temperature using one light source and one optical detector.

DISCLOSURE OF INVENTION

Technical Problem

Therefore, the present invention has been made in view of the above problems, and it is a first object of the present invention to provide an optical fiber distributed temperature sensor system having an automatic correction function and a method for measuring a temperature using thereof, in which an automatically corrected temperature can be measured using one light source and one optical detector.

A second object of the present invention is to provide an optical fiber distributed temperature sensor system having an automatic correction function and a method for measuring temperature using thereof, in which a wavelength difference between a stokes light and an anti-stokes light, dependency on an incident light, and physical obstacles existing in an optical fiber can be overcome.

A third object of the present invention is to provide an optical fiber distributed temperature sensor system having an automatic correction function and a method for measuring temperature using thereof, in which incorrectness of the measured temperature caused by differential attenuation can be simply and completely removed, and thus cost thereof can be saved.

Solution to Problem

To accomplish the above objects, according to one aspect of the present invention, there is provided a optical fiber distributed temperature sensor system having an automatic correction function, the system comprising: a light source unit including a power supply unit 100, a pulse generator 110, and a laser diode 105, for generating a pulse-modulated optical signal; a measured optical fiber 120 connected to the light source unit, through which the optical signal is entered and transmitted; a reflecting means 125 provided at one end of the measured optical fiber 120, for reflecting the optical signal transmitted through the measured optical fiber 120, along the measured optical fiber 120; an optical circulator 115 provided between the measured optical fiber 120 and the light source unit, for separating and transmitting an optical signal entered from the measured optical fiber 120 in a direction different from that of an optical signal entered from the light source unit; a Raman filter 130 connected to the optical circulator 115, for separating and passing only an anti-stokes Raman scattering optical signal among the optical signals separated and transmitted from the optical circulator 115; an optical detector 135 connected to the Raman filter 130, for converting the anti-stokes Raman scattering optical signal into an electrical signal that can be signal processed; an amplifier 140 connected to the optical detector 135, for amplifying the converted electrical signal; a digital converter 145 connected to the amplifier 140, for converting the amplified electrical signal into a digital form; and a signal processing unit 150 connected to the digital converter 145, for outputting temperature data distributed in a lengthwise direction of the measured optical fiber 120 as the temperature is measured using Raman effect.

In addition, the optical fiber distributed temperature sensor system further comprises an optical amplifier 160 for amplifying the optical signal generated by the light source unit between the light source unit and the optical circulator 115.

In addition, the optical amplifier 160 includes an EDFA and an ASE filter.

In addition, the reflecting means 125 is a mirror.

In addition, the reflecting means 125 reflects the optical signal entered from the light source unit and reflects a back scattering light generated from the measured optical fiber 120 for the reflected optical signal.

In addition, the optical signal entered into the optical detector 135 from the measured optical fiber 120 includes a normal back scattering optical signal generated from the measured optical fiber 120, a reflected back scattering optical signal generated from the measured optical fiber 120 for the optical signal reflected by the reflecting means 125, and a forward scattering optical signal generated from the measured optical fiber 120.

In addition, the optical detector 135 is an APD, and the APD detects the anti-stokes optical signal among the Raman scattering optical signal and converts the anti-stokes optical signal into the electrical signal.

In addition, the APD calculates an average value by repeatedly detecting the normal back scattering optical signal, the reflected back scattering optical signal, and the forward scattering optical signal.

In addition, the amplifier 140 includes a current amplifier and a voltage amplifier.

In addition, the temperature distributed along the measure optical fiber 120 is measured using only an anti-stokes Raman scattering light.

In addition, a temperature at a certain point z in the measured optical fiber 120 is calculated using a mathematical expression $$T(z) = \left( \frac{k_B}{hc\Delta v} \log\left( \frac{I_f(z_0)}{I_f(z)} \left( \exp^{\frac{hc\Delta v}{T(z_0)k_B}} - 1 \right) + 1 \right) \right)^{-1},$$

in which h denotes a Planck constant, c denotes a speed of the optical signal in a vacuum state, $\Delta v$ denotes a Raman shift rate in the measured optical fiber, kB denotes a Boltzmann constant, $T(z0)$ denotes a temperature at a reference point of the measured optical fiber, $If(z0)$ denotes intensity of an anti-stokes Raman scattering light at a reference point of the measured optical fiber, and $If(z)$ denotes intensity of the anti-stokes Raman scattering light at a certain point of the measured optical fiber.

In addition, the optical fiber distributed temperature sensor system further comprises a display unit for displaying information on the temperature across the entire measured optical fiber 120 on the screen based on the data outputted by the signal processing unit 150.

According to another aspect of the present invention, there is provided a method of measuring temperature using an optical fiber distributed temperature sensor system having an automatic correction function, the method comprising the steps of: generating a pulse-modulated optical signal, by a light source unit S410; entering the generated optical signal into a measured optical fiber 120 through an optical circulator 115 provided at one end of the measured optical fiber 120 S420; generating a scattering optical signal as the entered optical signal is transmitted along the measured optical fiber 120, transmitting a back scattering optical signal among the scattering optical signal along the measured optical fiber 120, and entering the back scattering optical signal into the optical circulator 115 S430; generating a reflected optical signal for the entered optical signal by a reflecting means 125 provided at the other end of the measured optical fiber 120, and generating a scattering optical signal as the reflected optical signal is transmitted in a direction to the optical circulator 115 along the measured optical fiber 120 S440; reflecting the back scattering optical signal among the scattering optical signal for the reflected optical signal by the reflecting means 125, transmitting the back scattering optical signal along the measured optical fiber 120, and entering the back scattering optical signal into the optical circulator 115 S450; transmitting the entered optical signals to a Raman filter 130 by the optical circulator 115, and separating and passing only an anti-stokes Raman scattering optical signal among the optical signals by the Raman filter 130 S460; converting the passed anti-stokes Raman scattering optical signal into an electrical signal by an optical detector 135, amplifying the electrical signal by an amplifier 140, and converting the amplified electrical signal into a digital signal by a digital converter 145 S470; and outputting temperature data distributed in a lengthwise direction of the measured optical fiber 120 based on the converted digital signal data by the signal processing unit 150 S480.

In addition, the step of generating an optical signal S410 further includes the step of amplifying the generated optical signal by the optical amplifier 160 connected to the light source unit.

In addition, the step of outputting temperature data S480 further includes the step of displaying information on the temperature across the entire measured optical fiber 120 on a screen based on the data by the display unit connected to the signal processing unit 150.

Advantageous Effects of Invention

According to an embodiment of the present invention, an automatically corrected temperature can be measured using one light source and one optical detector.

Furthermore, an automatically corrected temperature can be correctly measured by overcoming a wavelength difference between a stokes light and an anti-stokes light, dependency on an incident light, and physical obstacles existing in an optical fiber.

Furthermore, incorrectness of the measured temperature caused by differential attenuation can be simply and completely removed, and thus cost thereof can be saved.

MODE FOR THE INVENTION

<Temperature Sensor System>

Figure 1:
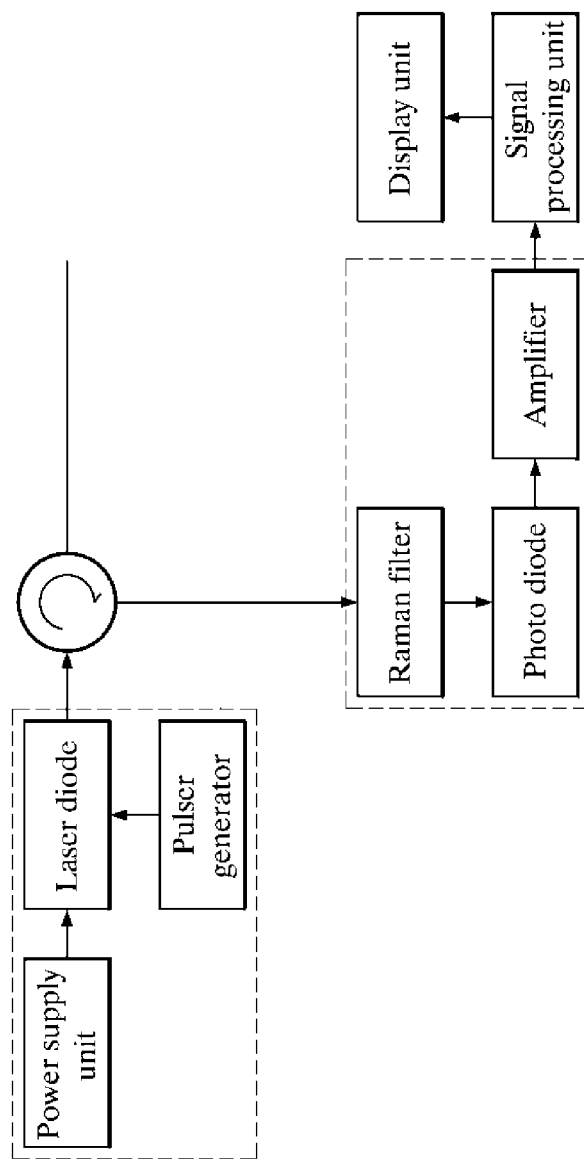
FIG. 1 is a view showing the configuration of a conventional Raman sensor system.
Figure 2:
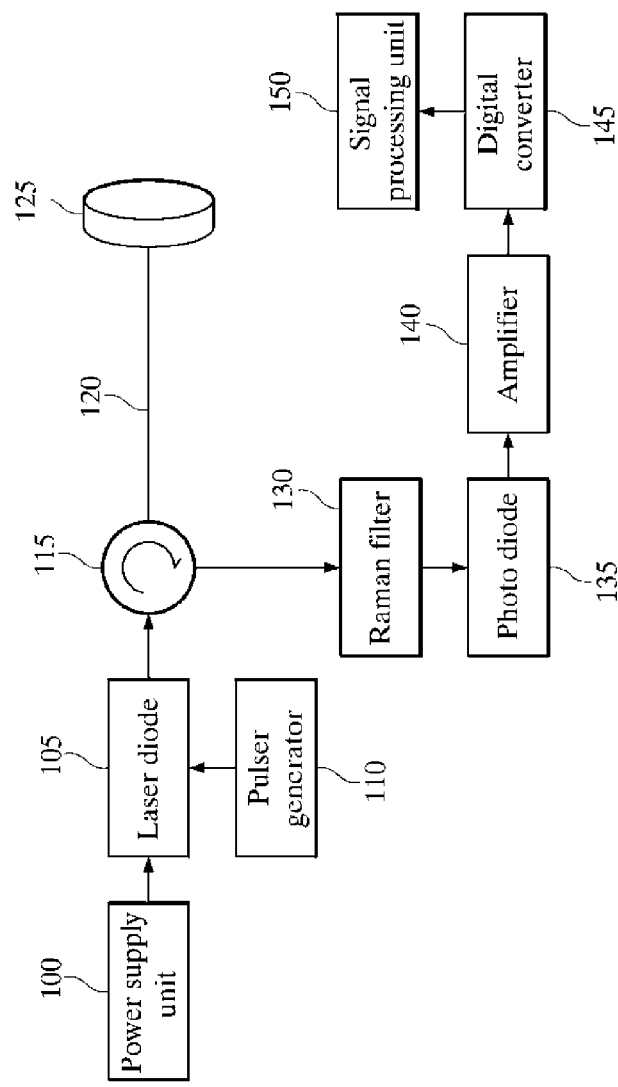
FIG. 2 is a view showing the configuration of an optical fiber distributed temperature sensor system according to an embodiment of the present invention.

FIG. 2 is a view showing the configuration of an optical fiber distributed temperature sensor system according to an embodiment of the present invention. As shown in FIG. 2, the optical fiber distributed temperature sensor system comprises a light source unit, a measured optical fiber 120, a reflecting means 125, an optical circulator 115, a Raman filter 130, an optical detector 135, an amplifier 140, a digital converter 145, and a signal processing unit 150. Hereinafter, constituents of the temperature sensor system will be described in detail.

The light source unit generates a pulse-modulated optical signal. The light source unit includes a power supply unit 100, a pulse generator 110, and a laser diode 105, and the power supply unit 100 supplies power needed for the units in the light source unit. The pulse generator 110 generates a driving current for driving the laser diode 105 in the form of a pulse. The laser diode 105 is an element for generating a laser optical signal when the power is supplied, which is small and able to generate a semiconductor laser beam of high intensity. The wavelength of the laser is preferably in the range of using a single mode optical fiber (1300 nm to 1550 nm). The pulse waveform of the current component is used as an input signal to drive the laser diode 105 and is modulated into an optical pulse signal in a high speed, and the optical signal is transmitted through the measured optical fiber 120.

On the other hand, the optical fiber distributed temperature sensor system may further comprise an optical amplifier 160 between the light source unit and the optical circulator 115. The optical amplifier 160 may be configured with an Erbium Doped Fiber Amplifier (EDFA) and an Amplified Spontaneous Emission (ASE). The EDFA is advantageous compared with a semiconductor laser amplifier in that it has a high gain, does not degrade even in high-speed signal transmission, and has a low noise figure. The ASE filter removes ASE noises accompanied by optical amplification of the EDFA. Since the optical amplifier 160 of the present invention amplifies the optical signal itself without performing light-to-electric conversion, optical components are not used for the light-to-electric conversion, and thus the configuration is simple and economic.

The optical fiber is a linear sensor which is linearly installed and senses temperatures distributed in the optical fiber. The optical fiber senses the temperatures in real-time across several sections which are continued as the optical fiber is formed to be extended in a long line. Since each part of the optical fiber functions as a point measurement sensor, the optical fiber itself operates in a form combining the point measurement sensors in a series. The optical fiber generates a back scattering light when the optical signal amplified by the optical amplifier 160 proceeds.

The reflecting means 125 reflects the optical signal received from the light source unit and reflects the back scattering light generated by the measured optical fiber 120 for the reflected optical signal. A mirror can be used as the reflecting means 125 in the present invention.

Figure 3:
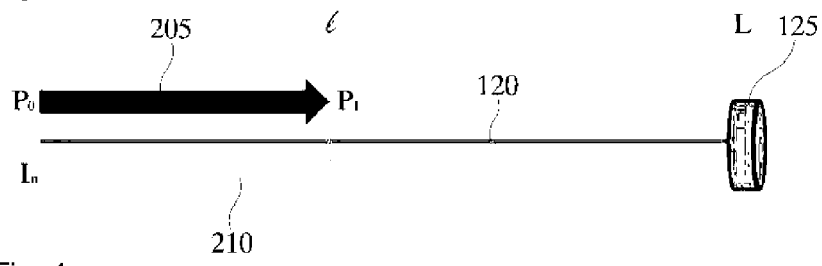
FIG. 3 is a view illustrating a normal back scattering optical signal generated according to an embodiment of the present invention.
Figure 4:
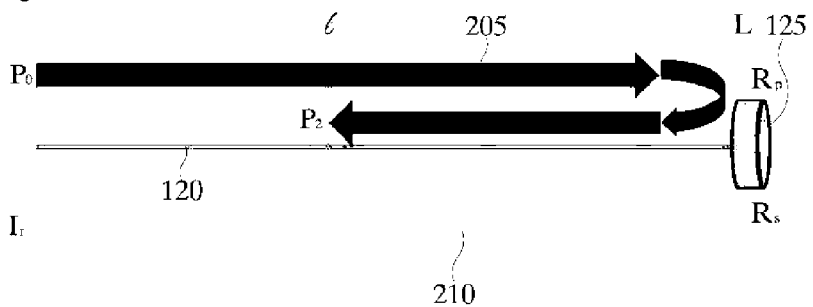
FIG. 4 is a view illustrating a reflected back scattering optical signal generated according to an embodiment of the present invention.

FIG. 3 is a view illustrating a normal back scattering optical signal 205 generated according to an embodiment of the present invention, and FIG. 4 is a view illustrating a reflected back scattering optical signal 210 generated according to an embodiment of the present invention.

Intensity In of the normal back scattering optical signal 205 shown in FIG. 3 can be expressed as shown in mathematical expression 1, and intensity Ir of the reflected back scattering optical signal 210 shown in FIG. 4 can be expressed as shown in mathematical expression 2.

$$I_n(l) = P_0 g(l,T) \exp(-\int_0^l \alpha_P(z)dz - \int_0^l \alpha_{AS}(z)dz) + C \qquad \text{[Mathematical expression 1]}$$

$$I_r(l) = P_0 R_P R_{AS} g(l,T) \exp(-\int_0^L \alpha_P(z)dz - \int_l^L \alpha_P(z)dz - \int_0^L \alpha_{AS}(z)dz - \int_l^L \alpha_{AS}(z)dz) + C \qquad \text{[Mathematical expression 2]}$$

Here, P0 denotes incident pump power, g(l,T) denotes a Raman scattering cross section captured in the measured optical fiber 120 at 1 having temperature T, and RP and RAS denote reflectance of the reflecting means 125 for the wavelengths of the entered optical signal and anti-stokes. If mathematical expression 1 is multiplied by mathematical expression 2, integral conditions are gathered together to be a constant for position l. Accordingly, mathematical expression 3 shown below can be obtained.

$$I_f(l) = \sqrt{(I_n(l) - C)(I_r(l) - C)} A R g(l,T) P_0$$

Here, $$A = \exp(-\int_0^l (\alpha_z(z) + \alpha_s(z))dz) \frac{1}{L},$$

and $$R = \sqrt{R_p R_s}. \qquad \text{[Mathematical equation 3]}$$

'A' denotes an integral function across the entire range of the measured optical fiber 120. All the transmission-related losses dependent on the position are removed from the term on the left side of mathematical expression 3, and g(i,T) dependent on temperature remains. That is, local attenuation gives the same amount of affects to the optical signal through the entire range and may be regarded as a constant. Accordingly, physical affects other than the temperature information can be removed from the measured optical signal. If a certain position z substitutes for l in mathematical expression 3, g(l,T) can be expressed as mathematical expression 4 shown below.

$$g(z,T) = \frac{I_f(z)}{ARP_0} \qquad \text{[Mathematical expression 4]}$$

Since g(z,T) is proportional to the differential cross section of the anti-stokes scattering light, the term on the left side of mathematical expression 4 can be replaced as shown in mathematical expression 5 below.

$$\frac{S}{\lambda_{AS}^4} \frac{1}{\exp\left(\frac{hc\Delta v}{k_B T(z)} - 1\right)} = \frac{I_f(z)}{ARP_0} \qquad \text{[Mathematical expression 5]}$$

Here, S denotes a proportional factor which means a scattering part captured by the numerical aperture of the measured optical fiber 120. A temperature formula such as mathematical expression 6 shown below can be obtained though a procedure similar to a conventional distributed temperature system (DTS), based on mathematical expression 5.

$$T(z) = \left(\frac{k_B}{hc\Delta v} \log\left(\frac{I_f(z_0)}{I_f(z)}\left(\exp^{\frac{hc\Delta v}{T(z_0)k_B}} - 1\right) + 1\right)\right)^{-1} \qquad \text{[Mathematical expression 6]}$$

Here, h denotes a Planck constant, c denotes a speed of the optical signal in the vacuum state, Δv denotes a Raman shift rate in the measured optical fiber, kB denotes a Boltzmann constant, T(z0) denotes a temperature at a reference point of the measured optical fiber, If(z0) denotes the intensity of an anti-stokes Raman scattering light at a reference point of the measured optical fiber, and If(z) denotes the intensity of the anti-stokes Raman scattering light at a certain point of the measured optical fiber.

In the optical fiber distributed temperature sensor system of the present invention, the absolute temperature at a certain position of the measured optical fiber 120 can be measured using only the anti-stokes Raman scattering optical signal based on mathematical expression 6.

The optical circulator 115 separates and transmits the optical signal entered from the measured optical fiber 120 in a direction different from that of the optical signal enter from the light source. Here, the optical signal entered from the measured optical fiber 120 includes a normal back scattering optical signal 210 generated from the measured optical fiber 120, a reflected back scattering optical signal 210 generated from the measured optical fiber 120 for an optical signal reflected by the reflecting means 125, and a forward scattering optical signal generated from the measured optical fiber 120. A component for separating the back scattering light in another direction so that the back scattering light may not return to the incident direction is required in order to measure the back scattering light, and it is the optical circulator 115. If the entire optical system is constructed in an optical fiber form, a 3 dB coupler and the optical circulator 115 are used in general. Although the 3 dB coupler is advantageous in price, it has an insertion loss of 3 dB, and light should pass through the 3 dB coupler twice while proceeding, and thus an insertion loss of 6 dB should be accepted on the whole. Although the optical circulator 115 of the present invention is more expensive than the 3 dB coupler, its insertion loss is approximately less than 1 dB, and thus furthermore scattering light can be acquired compared with the 3 dB coupler. Since the Raman scattering light is very weak, the back scattering light can be separated and acquired using the optical circulator 115 in the present invention in order to implement a system free from the loss to the maximum.

The Raman filter selects the anti-stokes Raman scattering optical signal from all scattering light that can be signal processed. A scattering light generated at an optical fiber includes a Rayleigh scattering light, a Brillouin scattering light, and a Raman scattering light depending on the cause of generation. Since the optical detector 135 generally operates in a wide wavelength band, a wavelength filter for blocking the Rayleigh scattering light and the Brillouin scattering light is needed in order to acquire only the Raman scattering light that is sensitive to temperature. A prism, a diffraction grating, or an optical filter can be used as the wavelength filter. The prism or the diffraction grating needs a lens or a mirror for focusing the light emitted from the optical fiber, and an optical aligning process is needed in order to send the light to the prism or the diffraction grating. In the present invention, it is preferable to use a Raman WDM filter capable of transmitting the scattering light directly from the optical fiber without the optical aligning process. The Raman WDM filter separates the scattering light generated at the optical fiber into a Rayleigh scattering light, a stokes Raman scattering light, and an anti-stokes Raman scattering light based on the wavelength.

A diode type light detecting component among semiconductor optical detectors 135 using generation of a carrier in a semiconductor through optical absorption can be used as the optical detector 135. The semiconductor diode type optical detector 135 is a component using characteristics on generation and transmission of the carrier at semiconductor junction surfaces of the same or different types. If a PN junction is rendered on the semiconductor and light is cast on the junction interface, a carrier that absorbs photon energy is generated. Flow of the carrier generated by the optical detector 135 generates a current, and the current becomes an electrical signal corresponding to an optical signal entered by an interaction with an external circuit. On the other hand, an avalanche photo diode (APD) can be used as the optical detector 135 in the present invention, and the APD detects an anti-stokes optical signal from the Raman scattering optical signal and converts the anti-stokes optical signal into an electrical signal. Here, the APD calculates an average value by repeatedly detecting the normal back scattering optical signal 210, the reflected back scattering optical signal, and the forward scattering optical signal.

The amplifier 140 amplifies the anti-stokes Raman scattering optical signal passing through the Raman filter 130 and detected by the optical detector 135. Since the Raman scattering optical signal is very weak, it is processed after the amplifier 140 amplifies the signal to be higher than 40 dB. On the other hand, a current amplifier 140a and a voltage amplifier 140b can be used as the amplifier 140 in the present invention.

The digital converter 145 is connected to the amplifier 140 and converts the amplified electrical signal into a digital form. It is since that the electrical signal should be converted into a digital form so as to be processed by a signal processing apparatus such as a computer or the like.

The signal processing unit 150 controls a Raman Optical Time Domain Reflectometer (OTDR) board and acquires data using a computer or the like. The signal processing unit 150 such as a computer or the like may control a Raman OTDR sensor system, and signal processing of the Raman OTDR including data acquisition from the system can be performed by a specific signal processing program. The signal processing program measures temperatures based on the principle of the OTDR, using Raman effect generated after the pulse-modulated optical signal is entered.

On the other hand, the temperature measuring system of the present invention may further comprise a display unit for displaying information on the temperature across the entire measured optical fiber 120 on a screen based on the data processed by the signal processing unit 150.

First Experimental Example

Figure 5:
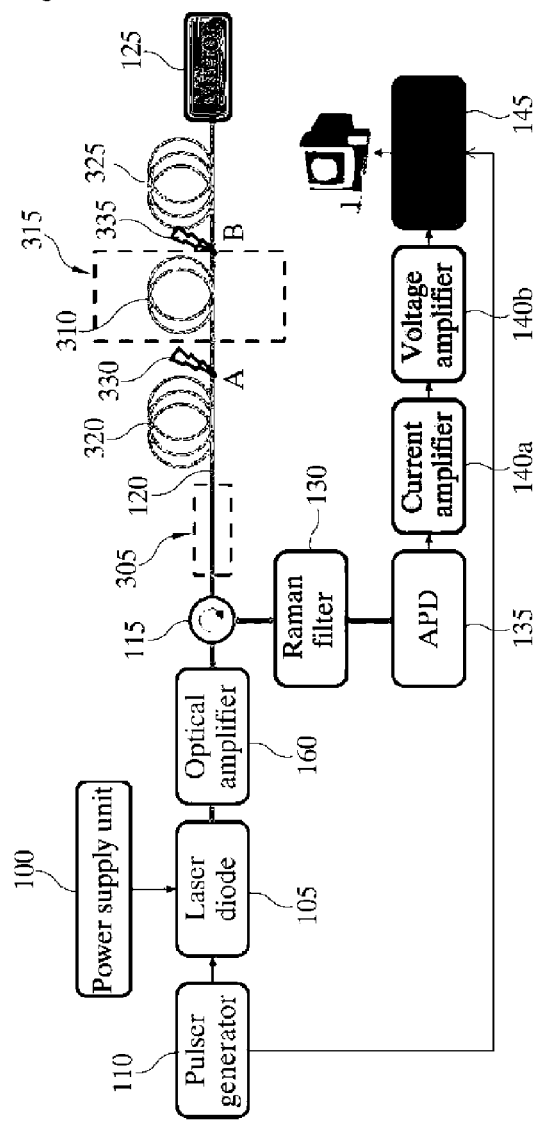
FIG. 5 is a view showing the configuration of an optical fiber distributed temperature sensor system having an automatic correction function according to first and second experimental examples for performing a temperature experiment of the present invention.

FIG. 5 is a view showing the configuration of an optical fiber distributed temperature sensor system having an automatic correction function according to a first experimental example for performing a temperature experiment of the present invention. As shown in FIG. 5, the configuration for the temperature experiment comprises a light source unit including a DC power supply unit 100, a pulse generator 110, and a laser diode 105, an optical amplifier 160, a measured optical fiber 120, a reflecting means 125 such as a mirror, an optical circulator 115, a Raman filter 130, an optical detector 135 such as an APD, an amplifier 140 including a current amplifier 140a and a voltage amplifier 140b, a high-speed digital converter 145, and a computer apparatus including a signal processing unit 150 and a display unit 155.

In the first experimental example, the length of the measured optical fiber 120 is set to 4.3 Km, and a reference optical fiber 305 is set at a certain position of the optical fiber. Spool A and spool B of 2 Km are prepared from the total length of the optical fiber, and a test optical fiber 310 of 50 m is set between the spool A and spool B. In addition, in the first experimental example, a signal between 2 µs and 3 µs is used as a reference signal generated from the optical fiber positioned between 200 m and 300 m from the optical circulator 115 in order to compensate degradation of the supplied power. Intensity of the anti-stokes Raman scattering optical signal with respect to time is measured while increasing the temperature of the test optical fiber 310 from the room temperature of 23° C. to 100° C. using an oven 315. In addition, the temperature of the reference optical fiber 305 is measured while the oven 315 is heated.

According to the first experimental example, the light source unit generates an optical signal having a wavelength of 50 ns and a frequency of 5 KHz, and the optical signal is amplified to 20 dB by the optical amplifier 160. The amplified optical signal enters into the measured optical fiber 120 through the optical circulator 115. On the other hand, SMF-28 is used as the measured optical fiber. The entered optical signal is transmitted along the measured optical fiber 120 and reflected by a mirror placed at the end of the measured optical fiber 120. The reflected optical signal returns to the optical circulator 115 and enters into the Raman filter 130. The reflectance of the mirror is 99% for the wavelength of the optical signal entered into the optical fiber from the light source and the wavelength of the anti-stokes Raman scattering optical signal. The anti-stokes Raman scattering optical signal is generated while the pulse-modulated optical signal is transmitted, and guided to return to the APD. A back-scattering optical signal is detected by the APD while the pulse-modulated optical signal is transmitted forward (the direction from the optical circulator 115 to the mirror). However, when the pulse-modulated optical signal is reflected by the mirror and then transmitted backward (the direction from the mirror to the optical circulator 115), the back scattering light is also reflected by the mirror. The reflected back scattering optical signal 210 is transmitted along the measured optical fiber 120 and detected by the APD. All the forward scattering lights transmitted together with the pulse-modulated incident light arrive at the APD between the normal scattering light and the reflected scattering light. All the optical signals including the normal back scattering anti-stokes optical signal, the forward scattering optical signal, and the reflected back scattering anti-stokes optical signal are detected by the APD and averaged 10,000 times for 47 seconds.

Figure 6:
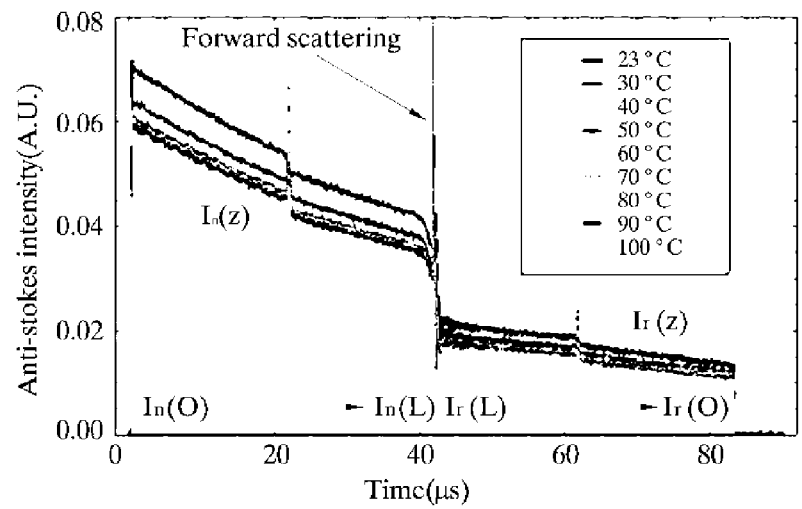
FIG. 6 is a graph showing a relation between time and intensity of anti-stokes according to the first experimental example of the present invention.

FIG. 6 is a graph showing a relation between time and intensity of anti-stokes scattering light according to the first experimental example of the present invention. As shown in FIG. 6, the normal back scattering anti-stokes optical signal, the forward scattering optical signal, and the reflected back scattering anti-stokes optical signal are positioned in order. In the case of the normal back scattering anti-stokes optical signal, the relation between time t and position z can be expressed as mathematical expression 7 shown below.

$$I_n(z) = I_s(t) = I_s(2z/v_g)$$ [Mathematical expression 7]

Here, vg denotes a group speed of the incident optical signal and the scattered optical signal in the measured optical fiber 120, and Is denotes a signal measured at time t. In addition, time t is in the range of 0<t<2L/vg.

However, in the case of the reflected back scattering anti-stokes optical signal, the relation between position z and time t can be expressed as mathematical expression 8 shown below.

$$I_r(z) = I_s(t) = I_s(2(2L-z)/v_g)$$  [Mathematical expression 8]

Here, vg denotes a group speed of the reflected optical signal and the scattered optical signal in the measured optical fiber 120, Is denotes a signal measured at time t, and time t is in the range of 2L/vg<t<4L/vg.

As shown in FIG. 6, attenuation of the optical signal induced by the connection loss has been observed around 22 μs and 61 μs due to the connection points between spool A 320 and spool B 325 of the optical fiber and the test optical fiber 310 of 50 m. The forward scattering optical signal is observed at 42 μs. As shown in FIG. 6, increase of the scattering optical signal according to the increase of temperature can be observed around 22 μs and 61 μs. On the other hand, difference of the total signal level can be regarded as being caused by degradation of the input power over a long operation time.

Figure 7:
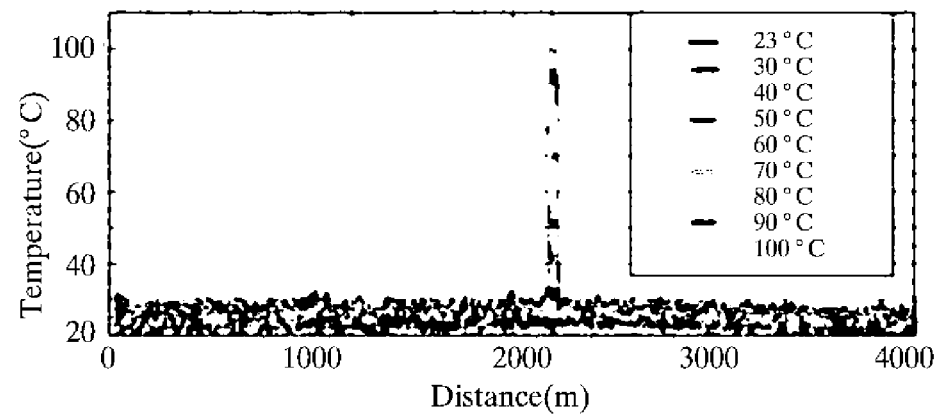
FIG. 7 is a graph showing a relation between distance and temperature according to the first experimental example of the present invention.
Figure 8:
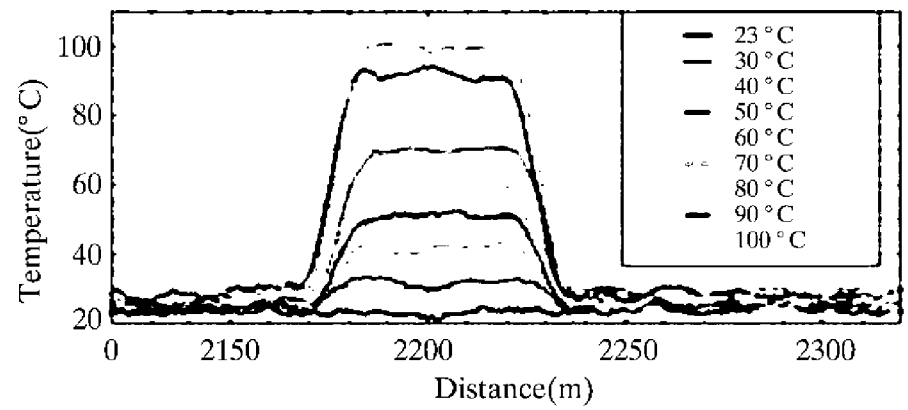
FIG. 8 is a graph showing an enlarged part of the graph in FIG. 7 according to the first experimental example of the present invention.

FIG. 7 is a graph showing a relation between distance and temperature according to the first experimental example of the present invention, and FIG. 8 is a graph showing an enlarged part of the graph in FIG. 7 according to the first experimental example of the present invention. The graphs in FIGS. 7 and 8 show distribution of temperature with respect to position z after the optical signal from the measured optical fiber 120 is processed, and it can be proved that such a result is the same as a result of the temperature formula of mathematical expression 6.

Second Experimental Example

Figure 9:
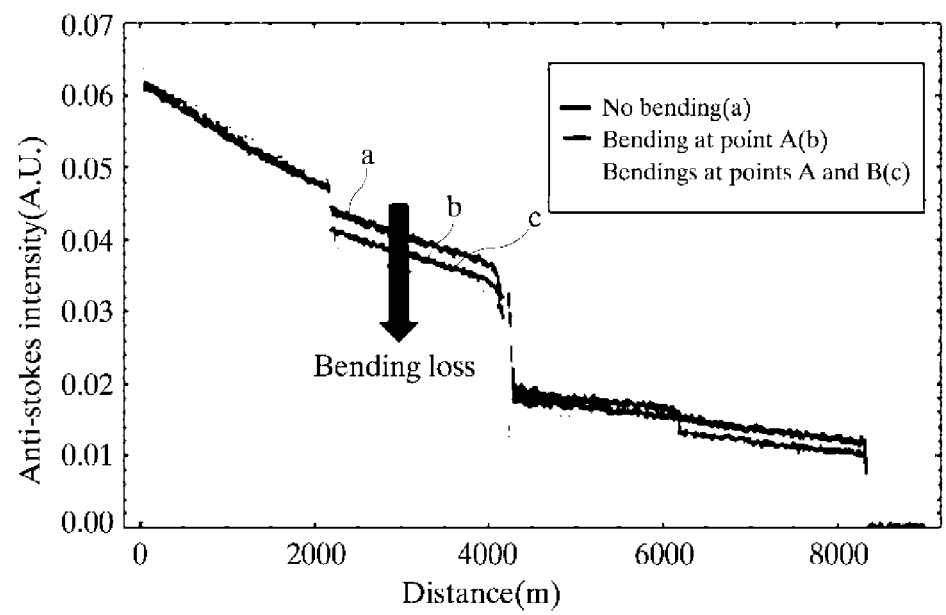
FIG. 9 is a graph showing a relation between distance and intensity of anti-stokes related to bending loss according to the second experimental example of the present invention.
Figure 10:
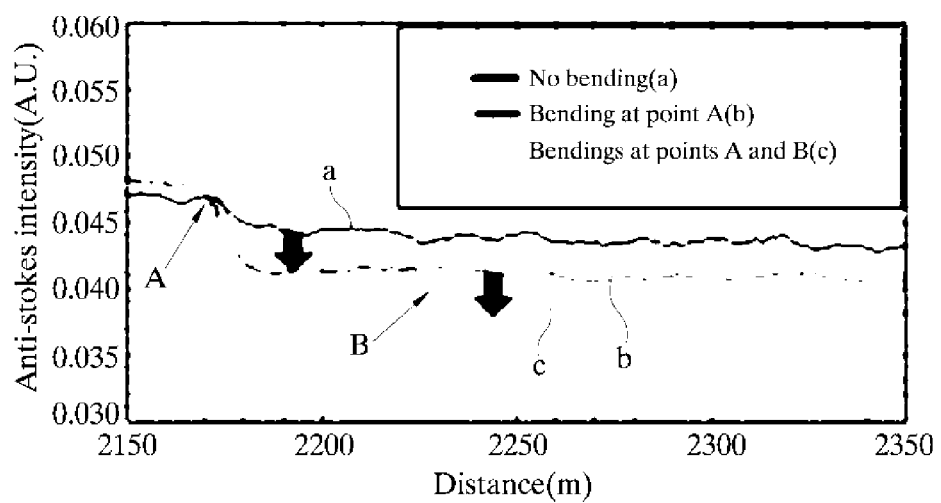
FIG. 10 is a graph showing an enlarged part of the graph in FIG. 9 according to the second experimental example of the present invention.
Figure 11:
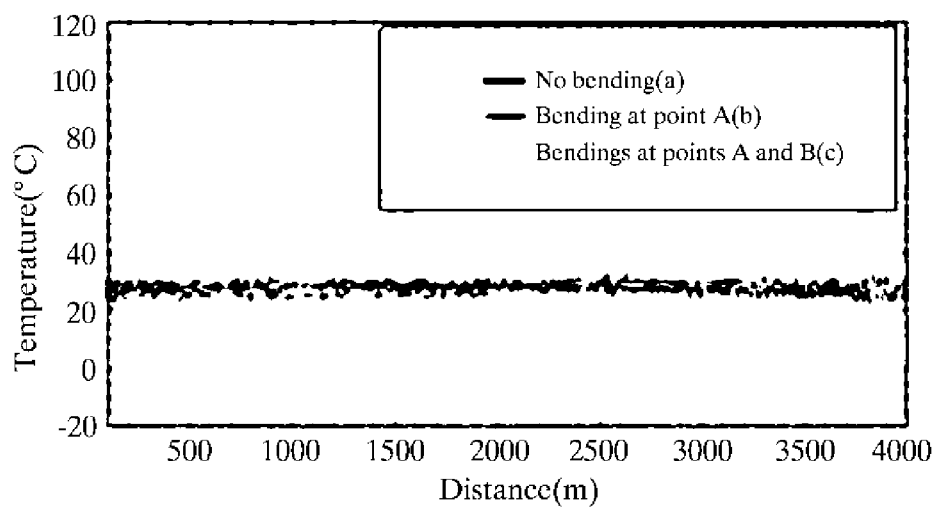
FIG. 11 is a graph showing a relation between distance and temperature according to the second experimental example of the present invention.

FIG. 9 is a graph showing a relation between distance and intensity of anti-stokes related to bending loss according to the second experimental example of the present invention, FIG. 10 is a graph showing an enlarged part of the graph in FIG. 9 according to the second experimental example of the present invention, and FIG. 11 is a graph showing a relation between distance and temperature according to the second experimental example of the present invention.

In order to confirm the automatic temperature correction function of the optical fiber distributed temperature sensor system according to the present invention, an experiment on bending is performed while maintaining the same temperature. As shown in FIG. 5, the configuration of the second experiment is similar to the configuration of the first experiment, and thus details thereof will not be described. However, bending A 330 and bending B 335 are set at point A and point B of the measured optical fiber 120 while maintaining a room temperature in the second experiment in order to perform the bending experiment, and changes of the optical signal related to the bending are measured. In the graphs of FIGS. 9 and 10, 'a' is a result when there is no bending, 'b' is a result when there is bending A 330, and 'c' is a result when there are bending A 330 and bending B 335. As shown in FIGS. 9 and 10, intensity of the anti-stokes optical signal with respect to distance tends to decrease as the number of bending points increase. That is, as shown in FIG. 10, the intensity of the anti-stokes optical signal is decreased as low as between 0.04 and 0.045 by the bending A 330, and the intensity of the anti-stokes optical signal is decreased below 0.04 as the bending B 335 is added.

However, as shown in FIG. 11, it is shown that the temperature measured in the system according to the second experimental example does not change despite the bendings. Through the result of the second experimental example, the automatic temperature correction function of the optical fiber distributed temperature sensor system can be confirmed. In addition, it is confirmed that since only one light source is used for the anti-stokes optical signal for calculating temperature, the affect of the differential attenuation that can be generated by using two lights of different wavelengths can be removed.

<Method of Measuring Temperature>

Figure 12:
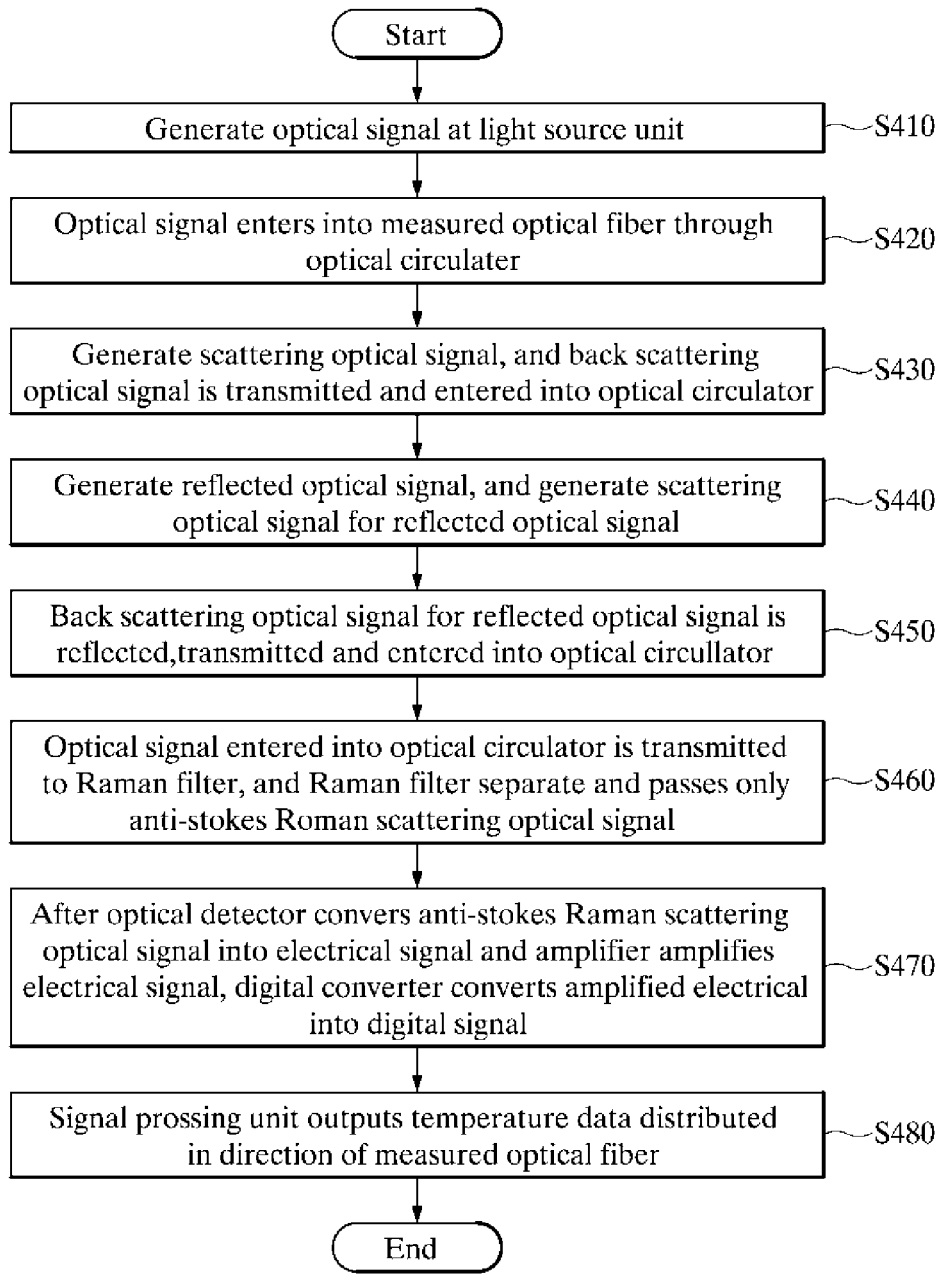
FIG. 12 is a flowchart sequentially illustrating a method for measuring automatically corrected temperature using anti-stokes Raman scattering light according to an embodiment of the present invention.

FIG. 12 is a flowchart sequentially illustrating a method for measuring automatically corrected temperature using anti-stokes Raman scattering light according to an embodiment of the present invention. As shown in FIG. 12, in measuring an automatically corrected temperature through the measured optical fiber 120, first, the light source generates a pulse-modulated optical signal S410. Next, the generated optical signal is entered into the measured optical fiber 120 through the optical circulator 115 provided at one end of the measured optical fiber 120 S420. Next, a scattering optical signal is generated as the entered optical signal is transmitted along the measured optical fiber 120, and a back scattering optical signal 210 among the scattering optical signal is transmitted along the measured optical fiber 120 and entered into the optical circulator 115 S430. Next, a reflected optical signal for an optical signal entered by the reflecting means 125 provided at the other end of the measured optical fiber 120 is generated, and a scattering optical signal is generated as the reflected optical signal is transmitted in the direction of the optical circulator 115 along the measured optical fiber 120 S440. Next, the back scattering optical signal 210 among the scattering optical signal for the reflected optical signal is reflected by the reflecting means 125, transmitted along the measured optical fiber 120, and entered into the optical circulator 115 S450. Next, the optical circulator 115 transmits the entered optical signals to the Raman filter 130, and the Raman filter 130 separates and passes only the anti-stokes Raman scattering optical signal among the optical signals S460. Next, the optical detector 135 converts the passed anti-stokes Raman scattering optical signal into an electrical signal, and after the amplifier 140 amplifies the electrical signal, the digital converter 145 converts the amplified electrical signal into a digital signal S470. Finally, the signal processing unit 150 outputs temperature data distributed in the lengthwise direction of the measured optical fiber 120 based on the converted digital signal data S480. Here, the step of generating an optical signal S410 may further include the step of amplifying the generated optical signal by the optical amplifier 160 connected to the light source unit. In addition, the step of outputting temperature data S480 may further include the step of displaying information on the temperature across the entire measured optical fiber 120 on a screen based on the data by the display unit 155 connected to the signal processing unit 150.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

The invention claimed is:
1. An optical fiber distributed temperature sensor system having an automatic correction function, the system comprising:
   a light source unit including a power supply unit, a pulse generator, and a laser diode, for generating a pulse-modulated optical signal;

a measured optical fiber connected to the light source unit, through which the optical signal is entered and transmitted;

a reflecting means provided at one end of the measured optical fiber, for reflecting the optical signal transmitted through the measured optical fiber, along the measured optical fiber;

an optical circulator provided between the measured optical fiber and the light source unit, for separating and transmitting an optical signal entered from the measured optical fiber in a direction different from that of an optical signal entered from the light source unit;

a Raman filter connected to the optical circulator, for separating and passing only an anti-Stokes Raman scattering optical signal among the optical signals separated and transmitted from the optical circulator;

an optical detector connected to the Raman filter, for converting the anti-Stokes Raman scattering optical signal into an electrical signal that can be signal processed;

an amplifier connected to the optical detector, for amplifying the converted electrical signal;

a digital converter connected to the amplifier, for converting the amplified electrical signal into a digital form; and a signal processing unit connected to the digital converter, for outputting temperature data distributed in a lengthwise direction of the measured optical fiber as the temperature is measured using a Raman effect, with a temperature at a certain point z in the measured optical fiber being calculated using a mathematical expression $$T(z) = \left( \frac{k_B}{hc\Delta v} \log\left( \frac{I_f(z_0)}{I_f(z)} \left( \exp^{\frac{hc\Delta v}{T(z_0)k_B}} - 1 \right) + 1 \right) \right)^{-1}$$

wherein:
h denotes a Planck constant,
c denotes a speed of the optical signal in a vacuum state,
$\Delta v$ denotes a Raman shift rate in the measured optical fiber,
$k_B$ denotes a Boltzmann constant,
$T(z_0)$ denotes a temperature at a reference point of the measured optical fiber,
$I_f(z_0)$ denotes intensity of an anti-Stokes Raman scattering light at a reference point of the measured optical fiber, and
$I_f(z)$ denotes intensity of the anti-Stokes Raman scattering light at the certain point z of the measured optical fiber.

2. The system according to claim 1, further comprising an optical amplifier for amplifying the optical signal generated by the light source unit between the light source unit and the optical circulator.

3. The system according to claim 2, wherein the optical amplifier includes an EDFA and an ASE filter.

4. The system according to claim 1, wherein the reflecting means is a mirror.

5. The system according to claim 1, wherein the reflecting means reflects the optical signal entered from the light source unit and reflects a back scattering light generated from the measured optical fiber for the reflected optical signal.

6. The system according to claim 1, wherein the optical signal entered into the optical detector from the measured optical fiber includes a normal back scattering optical signal generated from the measured optical fiber, a reflected back scattering optical signal generated from the measured optical fiber for the optical signal reflected by the reflecting means, and a forward scattering optical signal generated from the measured optical fiber.

7. The system according to claim 1, wherein the optical detector is an APD, and the APD detects an anti-Stokes optical signal among the Raman scattering optical signal and converts the anti-Stokes optical signal into the electrical signal.

8. The system according to claim 7, wherein the APD calculates an average value by repeatedly detecting the normal back scattering optical signal, the reflected back scattering optical signal, and the forward scattering optical signal.

9. The system according to claim 1, wherein the amplifier includes a current amplifier and a voltage amplifier.

10. The system according to claim 1, wherein the temperature distributed along the measure optical fiber is measured using only an anti-Stokes Raman scattering light.

11. The system according to claim 1, further comprising a display unit for displaying information on the temperature across the entire measured optical fiber based on the data outputted by the signal processing unit.

12. A method of measuring temperature using an optical fiber distributed temperature sensor system having an automatic correction function, the method comprising:

generating a pulse-modulated optical signal, by a light source unit;

entering the generated optical signal into a measured optical fiber through an optical circulator provided at one end of the measured optical fiber;

generating a scattering optical signal as the entered optical signal is transmitted along the measured optical fiber, transmitting a back scattering optical signal among the scattering optical signal along the measured optical fiber, and entering the back scattering optical signal into the optical circulator;

generating a reflected optical signal for the entered optical signal by a reflecting means provided at the other end of the measured optical fiber, and generating a scattering optical signal as the reflected optical signal is transmitted in a direction to the optical circulator along the measured optical fiber;

reflecting the back scattering optical signal among the scattering optical signal for the reflected optical signal by the reflecting means, transmitting the back scattering optical signal along the measured optical fiber, and entering the back scattering optical signal into the optical circulator;

transmitting the entered optical signals to a Raman filter by the optical circulator, and separating and passing only an anti-Stokes Raman scattering optical signal among the optical signals by the Raman filter;

converting the passed anti-Stokes Raman scattering optical signal into an electrical signal by an optical detector, amplifying the electrical signal by an amplifier, and converting the amplified electrical signal into a digital signal by a digital converter; and outputting temperature data distributed in a lengthwise direction of the measured optical fiber based on the converted digital signal data by the signal processing unit, with a temperature at a certain point z in the measured optical fiber being calculated using a mathematical expression $$T(z) = \left( \frac{k_B}{hc\Delta v} \log\left( \frac{I_f(z_0)}{I_f(z)} \left( \exp^{\frac{hc\Delta v}{T(z_0)k_B}} - 1 \right) + 1 \right) \right)^{-1}$$

wherein:
h denotes a Planck constant,
c denotes a speed of the optical signal in a vacuum state,
$\Delta v$ denotes a Raman shift rate in the measured optical fiber,
$k_B$ denotes a Boltzmann constant, $T(z_0)$ denotes a temperature at a reference point of the measured optical fiber, $I_f(z_0)$ denotes intensity of an anti-Stokes Raman scattering light at a reference point of the measured optical fiber, and $I_f(z)$ denotes intensity of the anti-Stokes Raman scattering light at the certain point z of the measured optical fiber.

13. The method according to claim 12, wherein the step of generating an optical signal further includes the step of amplifying the generated optical signal by the optical amplifier connected to the light source unit.

14. The method according to claim 12, wherein outputting temperature data further includes displaying information on the temperature across the entire measured optical fiber on a screen based on the data by the display unit connected to the signal processing unit.

* * * * *